United States Patent [19]

Peterson

[11] 4,081,749
[45] Mar. 28, 1978

[54] RE-ENTRY TELEMETRY SYSTEM

[75] Inventor: Karl F. Peterson, Saratoga, Calif.

[73] Assignee: The United States of America as represented by the Secretary of the Navy, Washington, D.C.

[21] Appl. No.: 733,663

[22] Filed: Oct. 18, 1976

[51] Int. Cl.² .............................................. H03K 7/02
[52] U.S. Cl. .................................... 325/113; 325/164
[58] Field of Search ................. 325/4, 6, 38 R, 38 A, 325/66, 113, 115, 164; 179/15.55 TC, 15 BL, 15 A; 340/173 R, 100 ST, 200; 333/29, 30

[56] References Cited

U.S. PATENT DOCUMENTS

| 3,027,425 | 3/1962 | Tannenbaum et al. ........ 179/15.55 T |
| 3,192,476 | 6/1965 | Nuffer et al. ......................... 325/115 |

Primary Examiner—Benedict V. Safourek
Attorney, Agent, or Firm—R. S. Sciascia; Charles D. B. Curry; Francis I. Gray

[57] ABSTRACT

A re-entry body telemetry system which uses a solid state delay device to delay selected channels of telemetry data to be retrieved at a faster rate after re-entry blackout. The system also transmits data whose frequency bandwidth is greater than standard IRIG bandwidths.

3 Claims, 1 Drawing Figure

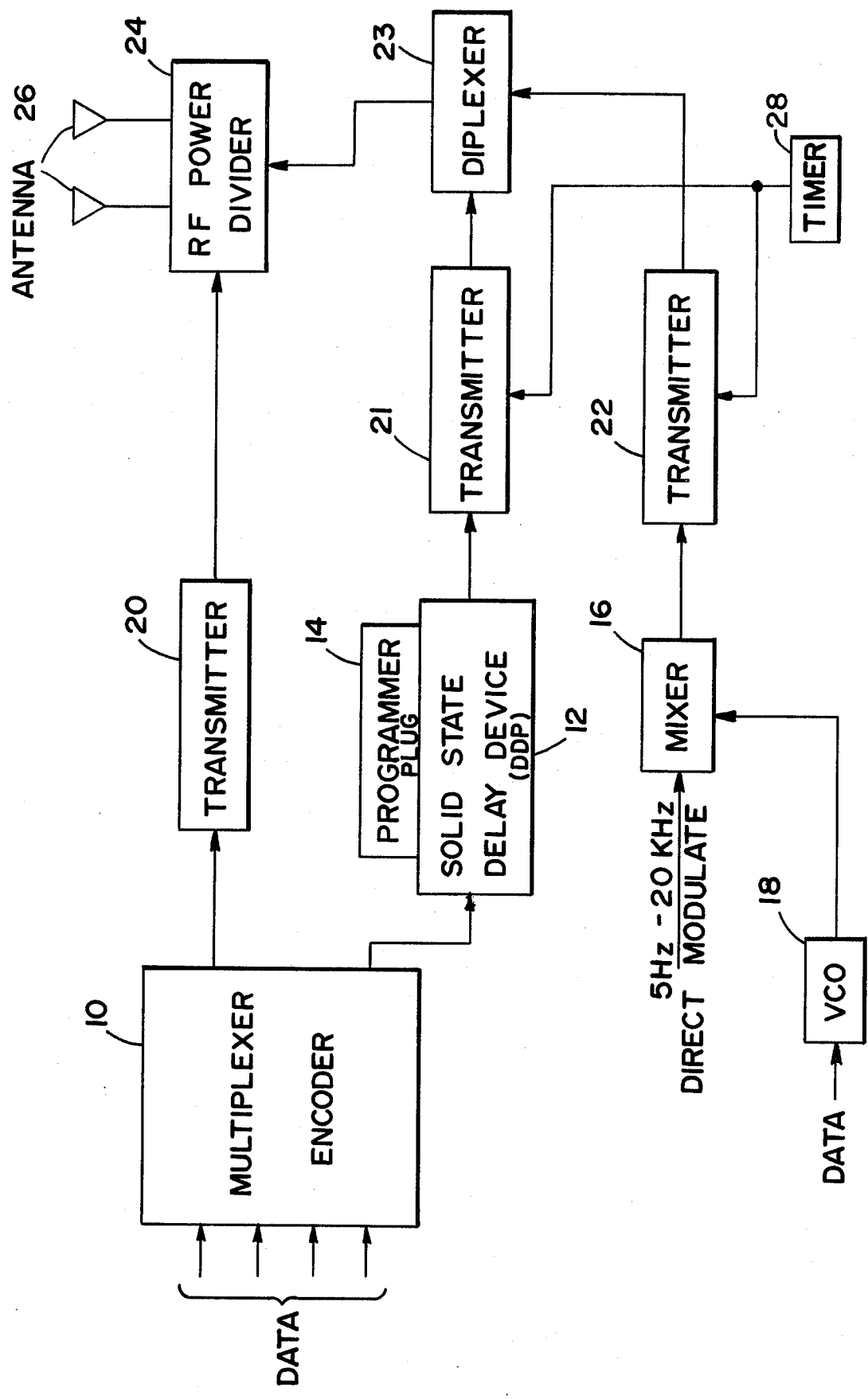

RE-ENTRY TELEMETRY SYSTEM

BACKGROUND OF THE INVENTION

1. Field of the Invention

The present invention relates to data transmission systems, and more particularly to a missile telemetry system.

2. Description of the Prior Art

It is a well-known fact that RF radiation from missile or space vehicle telemetry systems is severely attenuated during re-entry into the earth's atmosphere to the point that information is lost by reason of the missile passing through this "blackout" region. A tape recorder has been used in previous systems to record the telemetry data and to transmit the data directly from playback after a suitable delay. The tape recorder required a controlled "on" time, retaping for repeated output, and has a potential for jamming of the tape.

Also, standard IRIG telemetry proportional-bandwidth FM subcarriers only handle up to 5,000 Hz nominal, or 8,000 Hz maximum with constant bandwidth FM subcarriers, so that it is not possible to retrieve data over 8,000 Hz in frequency response by using existing FM subcarrier channels.

SUMMARY OF THE INVENTION

Accordingly, the present invention transmits (1) a PCM bit stream from a multiplexer/encoder, (2) a delayed PCM bit stream containing selected channels of the PCM bit stream delayed by a solid state delay device, and (3) an FM link for high frequency data. The solid state delay device stores selected data and transmits it repeatedly through an RF link at a high bit rate. The delayed PCM bit stream is diplexed with the FM link which is a combination of direct modulation by high frequency data with a special wide bandwidth voltage controlled oscillator output. The diplexed result is combined with the PCM bit stream from the multiplexer/encoder by an RF power divider for transmission via an antenna system.

STATEMENT OF THE OBJECTS OF THE INVENTION

It is an object of the present invention to provide a telemetry system for a re-entry body which will delay selected telemetry channels for high rate transmission after telemetry blackout during re-entry into the earth's atmosphere;

Another object of the present invention is to provide a telemetry system which will transmit high frequency data by a narrow-band transmitter;

Other objects, advantages and novel features of the invention will become apparent from the following detailed description of the invention when considered in conjunction with the accompanying drawing wherein:

BRIEF DESCRIPTION OF THE DRAWING

The FIGURE is a block diagram of a re-entry telemetry system of the present invention.

DESCRIPTION OF THE PREFERRED EMBODIMENT

Referring now to the FIGURE, multiplexer/encoder (M/E) 10 converts incoming data to a PCM bit stream which frequency modulates an RF transmitter 20. The PCM bit stream is also fed to a solid state delay device 12, also known as a digital delay programmer (DDP). A programmer in the DDP 12 selects the specific channels of the PCM bit stream that are to be delayed. The delayed PCM output of the delay device 12 frequency modulates a second RF transmitter 21. A data source modulates a voltage controlled oscillator (VCO) 18 and the VCO output is combined by an FM mixer 16 directly with a high frequency data signal, for example 5 Hz to 20,000 Hz in bandwidth. The output of the mixer 16 then modulates a third RF transmitter (FM link) 22. The outputs of the two transmitters 21, 22 are combined in a diplexer 23, and the output of the diplexer is combined with that of the first transmitter 20 in an RF power divider 24 to radiate through an antenna system 26.

A typical multiplexer/encoder 10 has 128 main frame channels with a frame rate of 512 frames per second. High sampling rate capability is provided by internally cross-strapping channels. For low sampling rates a sub-multiplexer is used to provide input to the multiplexer/encoder 10. Typical usage of the main frame channels is as follows:

| Number of Main Frame Works | Sampling Rate | Type of Signal | Number of Channels Required |
|---|---|---|---|
| 3 | 8,192 sps | Analog | 48 |
| 68 | 256 sps | Analog | 68 |
| 3 | 256 sps | Sync | 3 |
| 2 | 256 sps | Calibrate | 2 |
| 1 | 256 sps | Frame ID | 1 |
| 2 | 256 sps | Sub-Multiplexer | 2 |
| 4 | 256 sps | Bi-Level | 4 |

The output bit rate is 524,288 bps with 8 bits per word. The indicated sub-multiplexers can be programmed for low-level (0-50 mv) or high-level (0-5 v) data, and their sampling rate can be changed from 8 sps to 128 sps.

The DDP 12 accepts PCM data from the M/E 10, stores it and then outputs it. Since the storage capabilities of the delay device 12 are limited by volume in a missile application, the delay device selects and stores only a limited number of M/E data channels. The delayed data is repeated several times at a high bit rate, increasing the probability of retrieving the data that is stored during RF blackout. The output bit rate is constant with the total storage capacity (524,288 bits) equal to the bit rate so that storage readout (transmission) time is always 1 second. Typical configurations of the delay device 12 are as follows:

| Data Channels | Delay Time | Number of Data Repetitions per Second |
|---|---|---|
| 128 | 1 sec. | 1 |
| 64 | 2 sec. | 2 |
| 32 | 4 sec. | 4 |
| 16 | 8 sec. | 8 |

The DDP 12 outputs its complete contents every second, i.e., there is an inherent 1 second delay in passing data through the delay device. For longer delays, fener channels are input so that, for the configuration where 32 channels are selected for a 4 second delay, after 1 second the 32 channels at $t = 0$ are in the first portion of the delay device 12, after 2 seconds the 32 channels at $t = 0$ are in the second portion of the delay device and the 32 channels at $t = 1$ are now in the first portion, etc. After 4 seconds the 32 channels at $t = 0$ are in the last portion, $t = 1$ in the third portion, $t = 2$ in the second portion, etc., so that after 4 seconds the data at $t = 0$ is still being output and is not lost, i.e., 32 channels of information for each second are output 4 times before being lost.

A particular configuration used has a pre-programmed PROM (Program Read Only Memory) which selects the actual channels to be stored by the DDP 12 and the PROM has up to eight slots which can be programmed. A plug-in programmer plug 14 selects the slot programmed and the time delayed. The sampling rate of the channels is the same as the M/E sampling rate.

To transmit data with a frequency range of 5 Hz to 20,000 Hz would ordinarily require a transmitter with a 5 MHz bandwidth. However, by combining this data in the mixer 16 with the output of the special VCO 18, which has a center frequency of approximately 150 KHz ± a deviation dependent upon the voltage of the data input to it, a standard 1 MHz transmitter 22 is used. The mixer 16 also provides proper pre-emphasis between the VCO 18 and the high frequency data, as well as providing isolation between the two inputs and providing amplification, if required. If there is no requirement for the high frequency response capability, the output of the two transmitters 20, 21 can be combined directly by the RF power divider 24 for transmission.

The RF transmitters 20, 21, 22 are solid state, crystal controlled units which radiate in the S-band. The two transmitters 21, 22 are combined by the diplexer 23, which is then combined with the first transmitter 20 by the RF power divider 24, a stripline device, to drive one or more antennas 26.

A timer 28, for example, may be used to provide a turn-on command to the delay PCM link and the FM link during re-entry. This will prevent interference with the main missile telemetry frequencies during boost phase. The timer also serves to conserve battery power by keeping voltage off the unused circuits prior to re-entry. The realtime PCM link would not be affected by the timer.

Thus, the present invention provides a means for delaying selected data and transmitting it repeatedly at a high rate without using a tape recorder to retrieve data stored during RF blackout. The invention further provides a means for combining high frequency data with the telemetry PCM bit stream by using a standard narrow-band transmitter.

What is claimed is:

1. A re-entry telemetry system comprising:
    means for converting input data to an output pulse code modulated (PCM) bit stream;
    a first means for RF transmitting said output PCM bit stream;
    a solid state delay device to store selected data from said output PCM bit stream, and then to output said selected data repeatedly at a faster bit rate;
    a second means for RF transmitting said selected data output from said delay device; and
    means for combining and radiating the outputs of said two RF transmitting means.

2. A re-entry telemetry system as recited in claim 1 further comprising:
    a voltage controlled oscillator (VCO) having a frequency which deviates from a center frequency depending upon an input data signal voltage;
    means for mixing the output of said VCO directly with a wide frequency response data signal;
    a third means for RF transmitting the output of said mixer; and
    means for diplexing the output of said third transmitter means with said second transmitter means prior to said combining and radiating means.

3. A re-entry telemetry system as recited in claim 2 further comprising means for turning on said second and third Rf transmitting means just prior to re-entry.

* * * * *